United States Patent Office 3,219,640
Patented Nov. 23, 1965

3,219,640
FLAME-RESISTANT POLYMER COMPOSITIONS
Lieng Huang Lee, Midland, Mich., assignor to The Dow Chemical Company, Midland, Mich., a corporation of Delaware
No Drawing. Filed Sept. 5, 1962, Ser. No. 221,434
4 Claims. (Cl. 260—80.5)

This invention concerns flame-resistant plastic polymerization products. More particularly, it relates to polymers of certain esters of acrylic acids which may be polymerized with one or more polymerizable alkenyl aromatic compounds to form resinous, thermoplastic polymers which are highly resistant to burning.

Various esters of acrylic acids, and esters of methacrylic acids, have been prepared and have been polymerized to secure materials of high molecular weight, intended for use as plastics, varnishes and the like. It has now been found that the esters prepared by the interaction of 2-haloethyl alcohol derivatives with acrylic acids are particularly useful monomers for the preparation of polymeric industrial materials having desirable, flame-resistant properties. The invention includes interpolymers formed by the polymerization of such esters with at least one polymerizable alkenyl aromatic compound.

By a polymerizable alkenyl aromatic compound is meant a compound having the general formula:

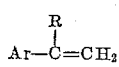

wherein Ar represents an aromatic hydrocarbon radical, or an aromatic halohydrocarbon radical, of the benzene series, and R is hydrogen or the methyl radical. Examples of such polymerizable alkenyl aromatic compounds are styrene, alpha methylstyrene, vinyltoluene, ar-ethylstyrene, vinylxylene, ar-chlorostyrene, ar-isopyropylstyrene, ar-tert.-butyl-styrene, and comonomeric mixtures of the above with minor amounts of other readily polymerizable olefinic compounds such as methyl methacrylate or acrylonitrile, among many others.

It is known that the halogen content of halogenated organic compounds often has an effect of reducing the flammability both of the compound containing the halogen and of flammable organic materials intimately admixed or polymerized therewith. It is also known that bromine-containing compounds possess, in most instances, a greater flame-retarding action than do corresponding chlorine containing compounds. However, the organic bromides differ widely among themselves in effectiveness as flame-retarding agents. Also, many organic bromides are excessively unstable to light and cause pronounced discoloration and degradation of plastic compositions comprising the same on standing, or during molding of the compositions.

It has now been discovered that the haloethyl esters of acrylic acids of the formula:

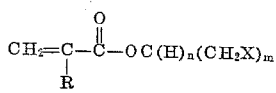

wherein R is hydrogen or the methyl radical, n is an integer from 1 to 2, X is halogen, and preferably bromine, and m is an integer of 1 to 2; may be polymerized with at least one of the polymerizable alkenyl aromatic compounds described herein to form industrially useful polymeric compositions having desirable flame-resistance.

Typical esters useful for the purposes of the present invention are 2-bromoethyl acrylate and methacrylate, and 1-(bromomethyl)-2-bromoethyl acrylate and methacrylate, and the corresponding halogen derivatives and suitable mixtures thereof.

The haloethyl esters of acrylic acids employed in the present invention may be prepared by reacting the acid with the desired alcohol. Still another method of forming the esters is by reacting a lower alkyl ester of the acrylic acid with the 2-haloethyl alcohol in an ester interchange, a catalyst being used to promote the interchange.

The conditions under which the polymerizable haloethyl derivatives are formed are mild: for example, the 2-haloethyl alcohol may be reacted with the acrylic acid described herein in a low-boiling solvent such as benzene on a water bath or an oil bath at temperatures ranging from about 80 to 150° C. The reaction is conducted under a reflux condenser to prevent volatilization of the solvent and/or the reaction constituents. Also, a catalyst such as p-toluene sulfonic acid is generally present to promote reaction, and a polymerization inhibitor such as phenothiazine is commonly employed to avoid polymerization of the ester during reaction. The 2-haloethyl alcohol and the acrylic acid may be reacted in various proportions, but generally the reactants will be employed in approximate equimolar amounts.

The so-formed haloethyl esters may be easily interpolymerized with desired amounts of one or more of the polymerizable alkenyl aromatic compounds described herein. Such polymerization may be accomplished in bulk, in solution, in emulsion, or in the presence of ultraviolet light.

The following examples, wherein all parts and percentages are to be taken by weight, illustrate the invention but are not to be construed as limiting its scope.

EXAMPLE 1

The 2-bromoethyl ester of methacrylic acid was prepared by placing in a one-liter glass reaction flask a mixture consisting of 90 grams (1.05 mole) of methacrylic acid and 126 grams (1 mole) of 2-bromoethanol dissolved in 100 milliliters of benzene. To the mixture was added 0.4 gram of phenothiazine and 1 gram of p-toluene sulfonic acid. The mixture was then gradually brought to the reflux temperature, and refluxed for a period of 24 hours, during which time 16 grams of water was obtained. The reaction mixture was washed twice with water and dried over anhydrous Na$_2$SO$_4$ over night. The benzene was subsequently removed by distillation under atmospheric pressure and the product obtained by distillation of the crude reaction product under vacuum. A yield of 64.5 grams of 2-bromoethyl methacrylate having a boiling point of 44° C. under 3 to 3.5 millimeters of mercury pressure was thereby obtained.

Thereafter, in each of a series of experiments, varying amounts of the so-formed 2-bromoethyl methacrylate were individually placed in a glass bomb tube with varying amounts of benzoyl peroxide and at least one of the polymerizable alkenyl aromatic compounds described herein. Each of such tubes was then individually sealed under nitrogen and the monomeric materials caused to polymerize by heating such tubes in a constant temperature oil bath at 100° C. for 2½ days and 150° C for 1 day. Following completion of polymerization, each of the so-formed polymeric materials was individually dispersed in methylene chloride and subsequently precipitated by adding the methylene chloride dispersion to methanol. Each of the precipitated polymeric materials was then separately dried over night at a temperature between 70 and 80° C., under reduced pressure. Individual films about 2 to 10 mils in thickness were separately obtained by compression molding a portion of each of the polymeric materials at 430° F. under 35 tons pressure for a period of about 2 minutes. The flame-resistant properties of each polmeric film were then determined, essentially as described by A.S.T.M. Method D-635-44.

The following Table I, illustrates the monomeric composition and flame-resistant properties of each of such polymeric materials.

Table I

| Run No. | Monomer Composition, grams. | | | | | Flame-Resistant Properties of Polymer |
|---|---|---|---|---|---|---|
| | 2-bromo-ethyl methac-rylate | Percent Benzoyl Peroxide | Styrene | Acrylo-nitrile | Methyl Methac-rylate | |
| 1 | 5 | 0 | 5 | | | Would not burn. |
| 2 | 5 | 0 | 7.5 | | | Do. |
| 3 | 5 | 0.03 | 10 | 5 | | Do. |
| 4 | 5 | 0.05 | 5 | | 10 | Do. |

EXAMPLE 2

The 2-bromoethyl ester of acrylic acid was prepared by placing in a one-liter glass reaction flask a mixture consisting of 79 grams (1.1 moles) of acrylic acid and 126 grams (1 mole) of 2-bromoethanol dissolved in 100 milliliters of benzene. To the mixture was added 0.4 gram of phenothiazine and 1 gram of concentrated sulfuric acid. The mixture was gradually brought to the reflux temperature and then refluxed for a period of 8 hours. The reaction mixture was washed with a 5 percent $Na_2CO_3$, 5 percent NaCl solution and twice with water, and dried over anhydrous $Na_2SO_4$ over night. The benzene was subsequently removed by distillation under atmospheric pressure and 88.5 grams of product obtained representing a 49 percent yield, such product having a boiling point of 62 to 66° C. at 12 millimeters of mercury pressure.

Thereafter, in each of a series of experiments, varying amounts of the so-formed 2-bromoethyl acrylate were individually placed in a glass bomb tube with at least one of the polymerizable alkenyl aromatic compounds described herein, and 0.05 weight percent benzoyl peroxide and each of such tubes individually sealed under nitrogen. The monomeric materials where then polymerized by individually heating each tube in a constant temperature oil bath at 100° C. for 2 days and subsequently at 150° C. for 1 day. Following completion of polymerization, each of the so-formed polymeric materials were individually precipitated, dried, compression molded into films, and such films tested for flame-resistance as described in Example 1.

The following Table II, illustrates the monomeric composition and flame-resistant properties of each of such polymeric compositions.

Table II

| Run No. | Monomer Composition | | | | Flame-Resistant Properties of Polymer |
|---|---|---|---|---|---|
| | 2-bromo-ethyl acrylate | Styrene | Acrylo-nitrile | Methyl Meth-acrylate | |
| 5 | 5 | 8.25 | | | Would not burn. |
| 6 | 5 | 7 | 3 | | Do. |
| 7 | 5 | 3.5 | | 6.5 | Do. |

The advantageous flame-resistant properties of the polymeric compositions of the present invention are readily apparent from the results reported on Table I and Table II.

Additionally, the homopolymers of the 2-bromoethyl acrylate and methacrylate described herein are generally white to light tan in color and possess good stability to heat at elevated temperatures, e.g. at temperatures as high as 250° C. to 300° C. There is therefore, little or no discoloring or yellowing of the polymeric compositions described herein because of deterioration of the polymerized 2-bromoethyl acrylate or methacrylate constituent of such polymer.

Similar good results are obtained wherein the haloethyl esters of acrylic acids as described herein are interpolymerized by any conventional method, and in any desired amounts with one or more of the polymerizable alkenyl aromatic compounds described herein.

What is claimed is:

1. A nonflammable thermoplastic polymeric composition suitable for the preparation of self-supporting films comprising an interpolymer of (1) from about 25–50 weight percent of at least one haloethyl ester selected from the group consisting of 2-bromoethylarcrylate and 2-bromoethylmethacrylate and (2) complementarily from about 75 and 50 weight percent of a comonomer selected from the group consisting of a polymerizable alkenyl aromatic compound of the formula:

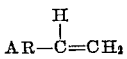

wherein AR is selected from the group consisting of an aromatic hydrocarbon radical of the benzene series and an aromatic halohydrocarbon of the benzene series and mixtures of said polymerizable alkenyl aromatic compound with a copolymerizable olefinic compound.

2. Composition of claim 1 wherein said polymerizable alkenyl aromatic compound is styrene.

3. Composition of claim 1 wherein said copolymerizable olefinic compound is acrylonitrile.

4. Composition of claim 1 wherein said copolymerizable olefinic compound is methyl methacrylate.

References Cited by the Examiner

UNITED STATES PATENTS 2,492,170  12/1949  Mast et al. _____ 260—86.3

JOSEPH L. SCHOFER, *Primary Examiner.*

LEON J. BERCOVITZ, *Examiner.*